(No Model.)
A. T. TEAKLES.
HORSE DETACHING DEVICE.
No. 387,664. Patented Aug. 14, 1888.
Fig. 1.
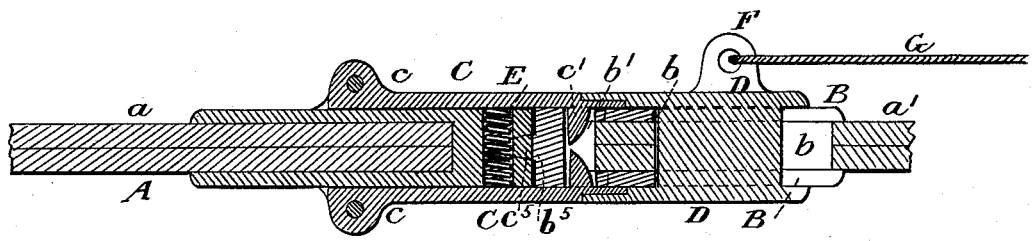
Fig. 2.
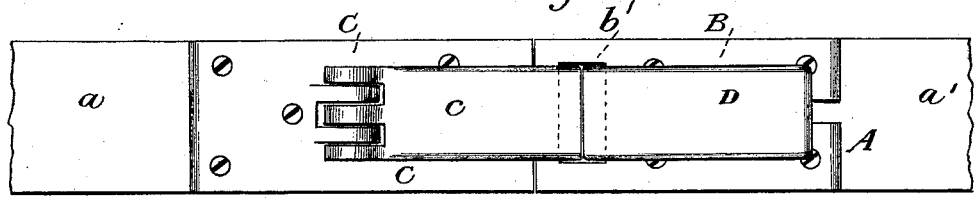
Fig. 3.
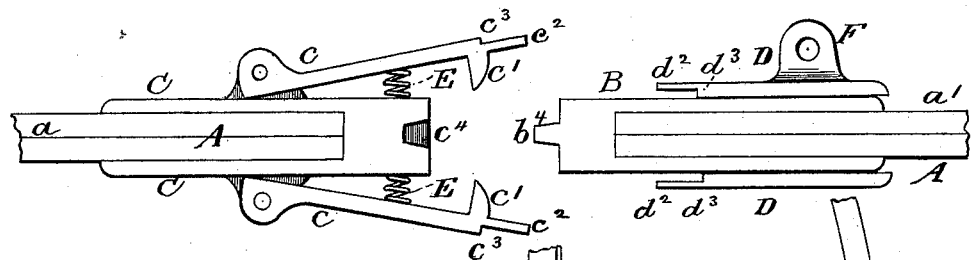
Fig. 4.
Witnesses,
A. Ruppert,
G. B. Towles.
Inventor,
A. T. Teakles.
Per
By his Attorney
Thomas K. Simpson.

UNITED STATES PATENT OFFICE.

ALONZO T. TEAKLES, OF ROXBURY, MASSACHUSETTS.

HORSE-DETACHING DEVICE.

SPECIFICATION forming part of Letters Patent No. 387,664, dated August 14, 1888.

Application filed January 13, 1888. Serial No. 260,636. (No model.)

*To all whom it may concern:*

Be it known that I, ALONZO T. TEAKLES, a citizen of the United States, residing at Roxbury Station, in the county of Suffolk and State of Massachusetts, have invented certain new and useful Improvements in Horse-Detachers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to enable the driver of a vehicle to instantly release the draft-horse from the shafts thereof as soon as he commences to run.

Figure 1 of the drawings is a horizontal section; Fig. 2, a side elevation; Fig. 3, a detail view of the clasps when unconnected with the trace, and Fig. 4 a detail view showing the breeching holdback-strap attached to the shaft-loop instead of to the usual iron loop under the shaft.

In the drawings, a trace is shown, as I use it, in two sections, $a\ a'$, the rear one being preferably very short. The two sections of the brace A are held detachably together by means of the two clasps B C, respectively made fast to the two sections $a\ a'$.

The clasp B has two slots, $b\ b'$, in the former of which works the slide D, while in the latter work the studs $c'\ c'$ of the two hinged arms $c\ c$ of the clasp C, said arms being thrown apart by the intermediate spring, E. The arms $c\ c$ have a lip, $c^2$, over which, when closed, fit the lips $d^2\ d^2$ up to the shoulders $c^3\ d^3$. The clasp B has a tenon, $b^4$, which fits into a slot, $c^4$, of clasp C to prevent lateral displacement, while the stud $d^5$ fits into an opening, $c^5$, so as to prevent any vertical displacement.

To the slide D, I preferably attach the eye F, and to this is attached a cord or chain, G, which is carried over the dash into the vehicle, so as to be within easy reach of the driver.

H is the metal hook against which the shaft-loop I is pulled in backing, and to this I attach the breeching-strap K, so that as soon as the cord or chain G is pulled by the driver the traces come apart and the horse leaves the vehicle.

What I claim as new, and desire to protect by Letters Patent, is—

1. A horse-detacher consisting of the two clasps B C, constructed and combined with two sections of a trace and a detaching-cord, substantially as shown and described.

2. The hinged arms $c\ c$, having the subjacent studs $c'\ c'$, and held apart by the spring E, in combination with the slide D, arranged to lock the clasps B C together, whereby the two parts of the trace may be fastened or unfastened, as set forth.

3. A trace made in two parts connected by two clasps, B C, provided at their meeting ends with the tenon and slot $b^4\ c^4$, the stud $d^5$, and the opening $c^5$, whereby the two parts of the trace cannot become vertically or horizontally displaced.

In testimony whereof I affix my signature in presence of two witnesses.

ALONZO T. TEAKLES.

Witnesses:
THOMAS RAE,
ELLEN GRANT.